United States Patent [19]
Ishikawa et al.

[11] Patent Number: 5,754,378
[45] Date of Patent: May 19, 1998

[54] TAPE CASSETTE

[75] Inventors: Ko Ishikawa; Kazumoto Yatabe, both of Miyaqi, Japan

[73] Assignee: Sony Corporation, Tokyo, Japan

[21] Appl. No.: 686,488

[22] Filed: Jul. 25, 1996

[30] Foreign Application Priority Data

Aug. 2, 1995 [JP] Japan .................................. 7-197741

[51] Int. Cl.⁶ .................................................. G11B 23/02
[52] U.S. Cl. .................................. 360/132; 242/346
[58] Field of Search ............................ 360/132; 242/346, 242/347.2

[56] References Cited

U.S. PATENT DOCUMENTS 4,625,252 11/1986 Balz .
5,601,248 2/1997 Begley .

Primary Examiner—A. J. Heinz
Attorney, Agent, or Firm—Jay H. Maioli

[57] ABSTRACT

A tape cassette in which fixed guide pins (9), (10) are disposed at positions in which a wrapping angle at which a magnetic tape is wound around the fixed guide pins (9), (10) when the magnetic tape is transported is reduced that is the position at which the tape wrapping angle does not exceed 40° wherein, a frictional force generated between the fixed guide pins (9), (10) and the magnetic tape (3) when the magnetic tape (3) is transported is reduced as compared with a conventional tape cassette, whereby a load on a motor for transporting the magnetic tape (3) is reduced, resulting in a life of a battery being extended.

5 Claims, 5 Drawing Sheets

TAPE CASSETTE

BACKGROUND OF THE INVENTION

The present invention relates to a tape cassette for recording and reproduction, and particularly to an assembly of fixed guide pins disposed in a tape travel path.

FIG. 1 of the accompanying drawings shows an example of a conventional tape cassette.

A tape cassette, generally depicted by reference numeral 1 in FIG. 1, is what might be called an audio compact cassette. The tape cassette 1 includes a cassette housing 2 comprising an upper cassette shell 2A and a lower cassette shell 2B, each of which is made of a styrene resin and which are fastened together by a proper method such as fusing.

The cassette housing 2 incorporates therein a pair of reel hubs, i.e., a supply reel hub 4 and a take-up reel hub 5 around which there is wound a tape (magnetic tape) 3. Each of the reel hubs 4 and 5 is made of resin such as POM. A tape starting portion of the magnetic tape 3 wrapped around the reel hubs 4, 5 is fixed to the take-up reel hub 5 by a clamper 5a, and an ending portion thereof is fixed to the supply reel hub 4 by a clamper 4a.

An opening portion 6 for exposing the magnetic tape 3 is defined in the front surface of the cassette housing 2, i.e., a tape travel path is formed such that the magnetic tape 3 unreeled from the supply reel hub travels on the opening portion 6 and is wound around the take-up reel hub 5.

On this tape travel path, in the lower cassette shell 2B, a pair of rotating guide rollers 7, 8 are pivotally and symmetrically supported to the left and right sides of the opening portion 6. Columnar fixed guide pins 7, 8 are implanted between the rotating guide rollers 7, 8 and the reel hubs 4, 5. Accordingly, the magnetic tape 3 is guided by the rotating guide rollers 7, 8 and the fixed guide pins 9, 10, thereby being transported along a predetermined tape travel path.

As shown in FIG. 2, the fixed guide pins 9, 10 are placed outside a common outer tangent a which contacts a practical maximum winding diameter 3A of the magnetic tape 3 wound around the reel hubs 4, 5 and the circumferential surface (tape guide surface) of the rotating guide rollers 7, 8. The practical maximum winding diameter 3A is a practical maximum value of the tape winding diameter obtained in consideration of standards of hub diameter based on the IEC standard (greater than 21 mm), tape thickness and tape length standardized by the MIAJ standard and a space of the cassette housing, and is about 53 mm in diameter.

Although not shown, thin liner sheets made of a lubricant material such as PET are disposed between the upper cassette shell 2A and the reel hubs 4, 5 and between the lower cassette shell 2B and the reel hubs 4, 5 so as to sandwich the reel hubs 4, 5 in the upper and lower directions. The thin liner sheets are used in order to enable the magnetic tape 3 to travel stably and to enable the magnetic tape 3 to be uniformly wound around the reel hubs 4, 5.

Guide ribs 11, 12 for restricting the tape width direction are deposed between the reel hubs 4, 5 and the fixed guide pins 9, 10 in somewhere of the tape travel path.

As shown in FIG. 3, the guide ribs 11, 12 are symmetrically formed on the upper cassette shell 2A and the lower cassette shell 2B of the cassette housing 2. The guide ribs 11, 12 restrict upper and lower edge portions of the magnetic tape 3, whereby the magnetic tape 3 is suppressed from fluctuations in its width direction. Therefore, the magnetic tape 3 can be uniformly wound around the reel hubs 4, 5.

Referring back to FIG. 1, the opening portion 6 at its central portion in which the magnetic tape 3 is exposed is a head insertion portion into which a magnetic head (not shown) is inserted. To the inner part of the head insertion portion, there is assembled a leaf spring 15 comprising a metal shield plate 15 for magnetically shielding the magnetic tape 3 wound around the reel hubs 4, 5 and the magnetic head and a pressing pad 14 made of felt for urging the magnetic tape 3 against the magnetic head. The pressing pad 14 is attached to the central portion of the leaf spring 15.

In the front portion of the cassette housing 2, there are symmetrically defined cassette position positioning reference apertures 16, 17 and capstan insertion apertures 18, 19 at the same positions of the upper cassette shell 2A and the lower cassette shell 2B, respectively.

Under the condition that the thus made tape cassette 1 is loaded onto a cassette player (not shown), positioning pins of the cassette player are engaged into the reference apertures 16, 17 and thereby the tape cassette 1 is positioned properly. At the same time, hub drive shafts of the cassette player are engaged with the reel hubs 4, 5 and capstans (not shown) are fitted into the capstan insertion apertures 18, 19.

In this state, when the user depresses a play button of the cassette player, then the magnetic head is inserted into the opening portion 6 and contacts with the magnetic tape 3. Concurrently therewith, pinch rollers (not shown) are inserted and urged against the capstans across the magnetic tape 3. In this state, the capstans are rotated by a drive force of a motor (not shown) and the hub drive shafts are rotated, whereby the take-up reel hub 5 is rotated in the counter-clockwise direction to transport the magnetic tape 3, thereby reproducing the magnetic tape 3.

When the magnetic tape 3 is transported, slide load resistances (between reel hubs 4, 5 and the liner sheets, between the magnetic tape 3 and the liner sheets, between the magnetic tape 3 and the pressing pad 14 and slide load resistances in respective parts of the tape cassette 1) are generated, and the magnetic tape 3 is stretched to a stiffness in the backward direction by a tension generated in the cassette player.

When the magnetic tape 3 is tensioned as described above, a frictional force is generated between the fixed guide pins 9, 10 and the magnetic tape 3. Specifically, as shown in FIG. 4, since the fixed guide pins 9, 10 guide the magnetic tape 3 with a tape wrapping angle θ of a certain degree, if the magnetic tape 3 is tensioned, then a frictional force is generated between the fixed guide pins 9, 10 and the magnetic tape 3 in response to the tape wrapping angle θ.

A force generated by a friction generated between the fixed guide pins and the magnetic tape is generally expressed by the following equation (1):

$$\text{Take-up reel hub side tension } T_2 = T_1 e^{\mu\theta} \tag{1}$$

where $T_1$ is the supply-side tension, $\mu$ is the coefficient of kinetic friction, θ is the tape wrapping angle, and $T_1 - T_2$ is the frictional force.

A study of the above equation (1) reveals that the frictional force generated in response to the tape wrapping angle θ is changed exponentially.

In other words, a frictional force becomes large as the wrapping angle θ at which the magnetic tape 3 is wound around the fixed guide pins 9, 10 becomes large, and a frictional force becomes small as the tape wrapping angle θ becomes small.

Having examined the conventional tape cassette, it is to be understood that the wrapping angle θ at which the magnetic tape 3 is wound around the fixed guide pins 9, 10 is large due to a positional relationship of the fixed guide pins 9, 10.

The wrapping angle θ of the magnetic tape 3 is fluctuated as the diameters with which the magnetic tape 3 is wound around the reel hubs 4, 5 are changed during the magnetic tape 3 is transported. In the illustrated conventional tape cassette 1, the tape wrapping angle exceeds 40° at maximum. In all audio compact cassettes now commercially available on the market together with the illustrated conventional tape cassette 1, the wrapping angle θ at which the magnetic tape 3 is wrapped around the fixed guide pins 9, 10 when the magnetic tape 3 is transported is generally arranged to exceed 40° at maximum.

Since the magnetic tape 3 is wound around the fixed guide pins 9, 10 with such large wrapping angle θ, a large frictional force of a magnitude corresponding to such large wrapping angle θ is generated between the fixed guide pins 9, 10 and the magnetic tape 3 when the magnetic tape 3 is transported.

The thus generated frictional force becomes a load resistance against the motor for transporting the magnetic tape, thereby increasing a motor drive current.

The increase of the motor drive current leads to the decrease of life of a battery in a small device such as a portable cassette player, which is disadvantageous in actual practice.

SUMMARY OF THE INVENTION

In view of the aforesaid aspect, it is an object of the present invention to provide a tape cassette in which a frictional force generated between fixed guide pins and a magnetic tape when the magnetic tape is transported is reduced so that a motor drive current can be reduced.

It is another object of the present invention to provide a tape cassette in which a life of a battery in a small cassette player can be extended.

There is provided a tape cassette which is comprised of a cassette housing, a pair of reel hubs around which a magnetic tape is wound, a pair of reel hubs being rotatably housed in the cassette housing, rotating guide rollers and fixed guide pins for guiding the magnetic tape being disposed in a tape travel path between the rotating guide rollers and the fixed guide pins, wherein the fixed guide pins are disposed at the position in which a wrapping angle at which the magnetic tape is wound around the fixed guide pins does not exceed 40°.

With the above arrangement, since the angle at which the magnetic tape is wound around the fixed guide pins is reduced as compared with the conventional tape cassette, a frictional force generated between the fixed guide pins and the magnetic tape is reduced with the result that a motor drive current can be reduced, thereby extending a life of a battery.

DETAILED DESCRIPTION OF THE PREFERRED EMBODIMENT

The present invention will now be described.

Figure 5:
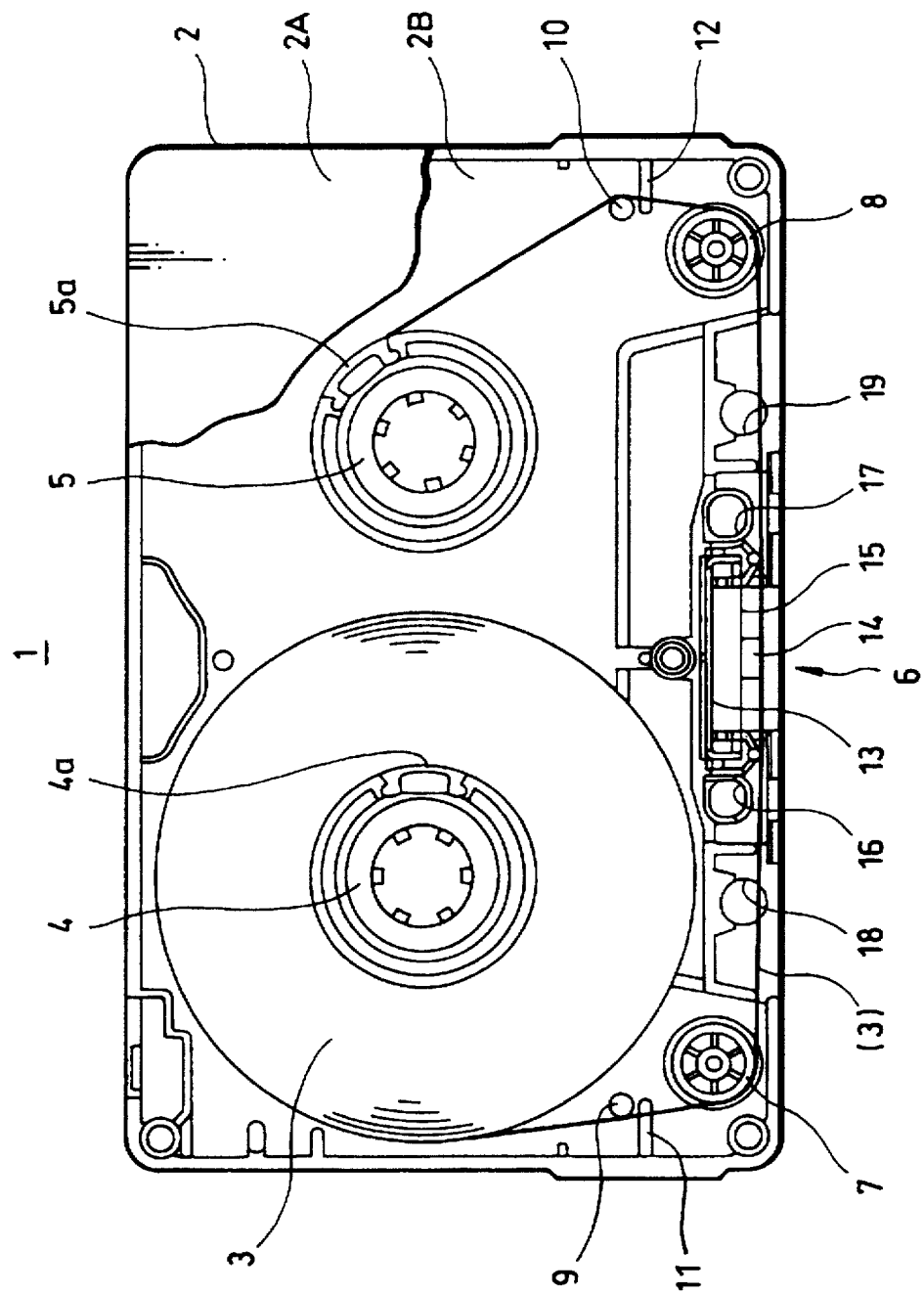
FIG. 5 is a plan view showing a tape cassette according to the present invention with an upper cassette shell being cut away.

FIG. 5 shows a tape cassette according to the present invention. A tape cassette, generally depicted by reference numeral 1 in FIG. 5, is a so-called audio compact cassette similarly to the conventional tape cassette mentioned hereinbefore. The tape cassette 1 has a cassette housing 2, and the cassette housing 2 comprises an upper cassette shell 2A and a lower cassette shell 2B, each of which is made of styrene resin, which are fastened together by a proper method such as fusing.

The cassette housing 2 incorporates therein a pair of reel hubs around which a tape (magnetic tape) 3 is wound, i.e., a supply reel hub 4 and a take-up reel hub 5 such that the supply reel hub 4 and the take-up reel hub 5 become freely rotatable. The supply reel hub 4 and the take-up reel hub 5 are each made of resin such as POM. A starting end of the magnetic tape 3 is fixed to the take-up reel hub 5 by a clamper 5a and an ending end of the magnetic tape 3 is fixed to the supply reel hub 4 by a damper 4a.

An opening portion 6 for exposing the magnetic tape 3 is defined in the front surface portion of the cassette housing 2. Specifically, a tape travel path is formed such that the magnetic tape 3 unreeled from the supply reel hub 4 is transported over the opening portion 6 and wound around the take-up reel hub 5.

In the tape travel path, a pair of rotating guide rollers 7, 8 are pivotally supported at left and right positions of the opening portion 6 of the lower cassette shell 2B. Columnar fixed guide pins 9, 10 are implanted between the rotating guide rollers 7, 8 and the reel hubs 4, 5. The magnetic tape 3 is guided by the rotating guide rollers 7, 8 and the fixed guide pins 9, 10 and thereby transported along the predetermined tape travel path.

The position of the fixed guide pins 9, 10 is changed considerably, i.e., the fixed guide pins 9, 10 are disposed at new positions such that the wrapping angle θ of the magnetic tape 3 becomes small as compared with that of the conventional tape cassette.

The position of the fixed guide pins 9, 10 will be described in detail later on.

Guide ribs 11, 12 for restricting the width direction fluctuations of the magnetic tape 3 are disposed between the fixed guide pins 9, 10 and the rotating guide rollers 7, 8 in the tape travel path.

Figure 1:
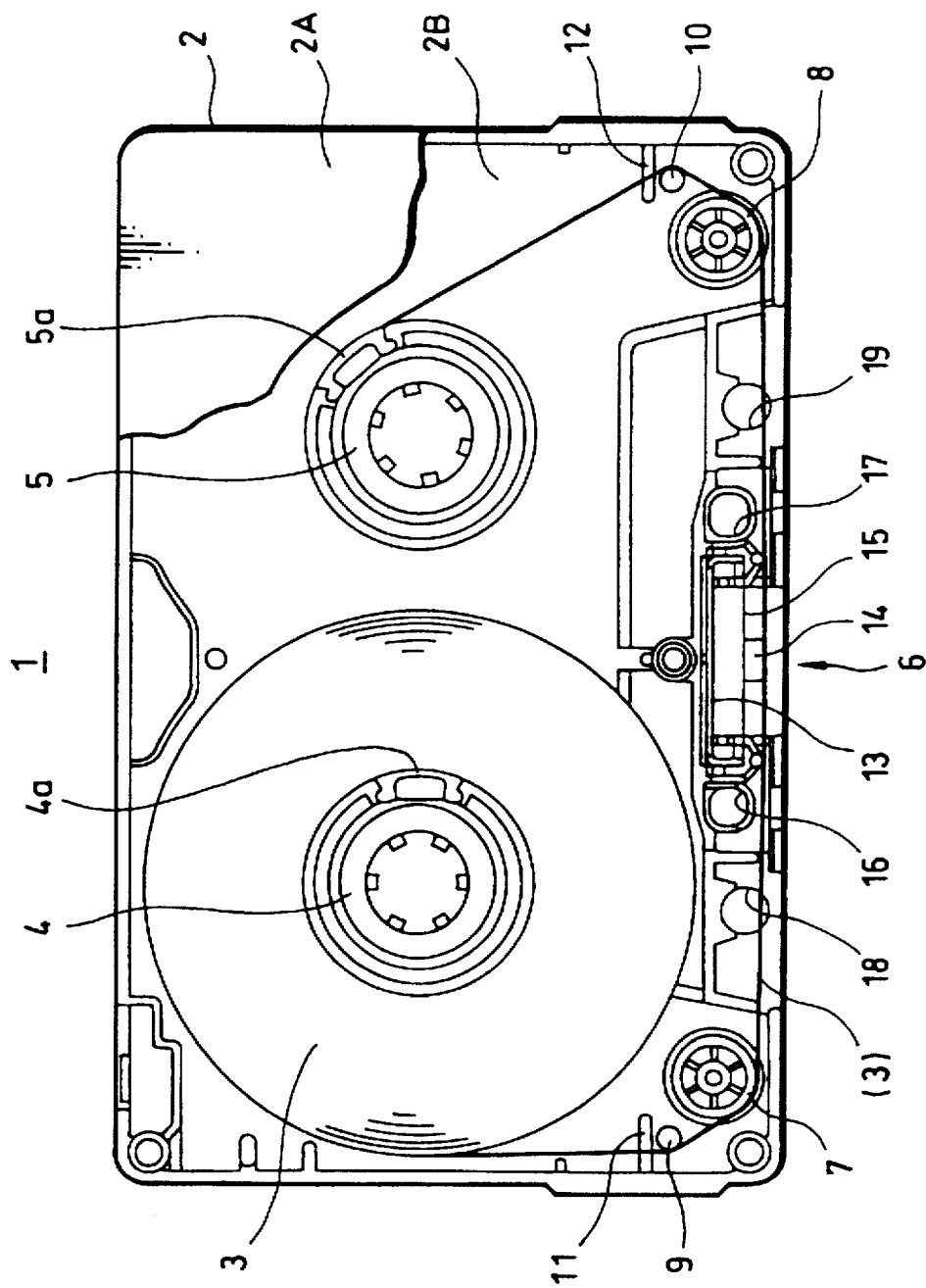
FIG. 1 is a plan view showing a conventional tape cassette with an upper cassette shell being cut away.
Figure 2:
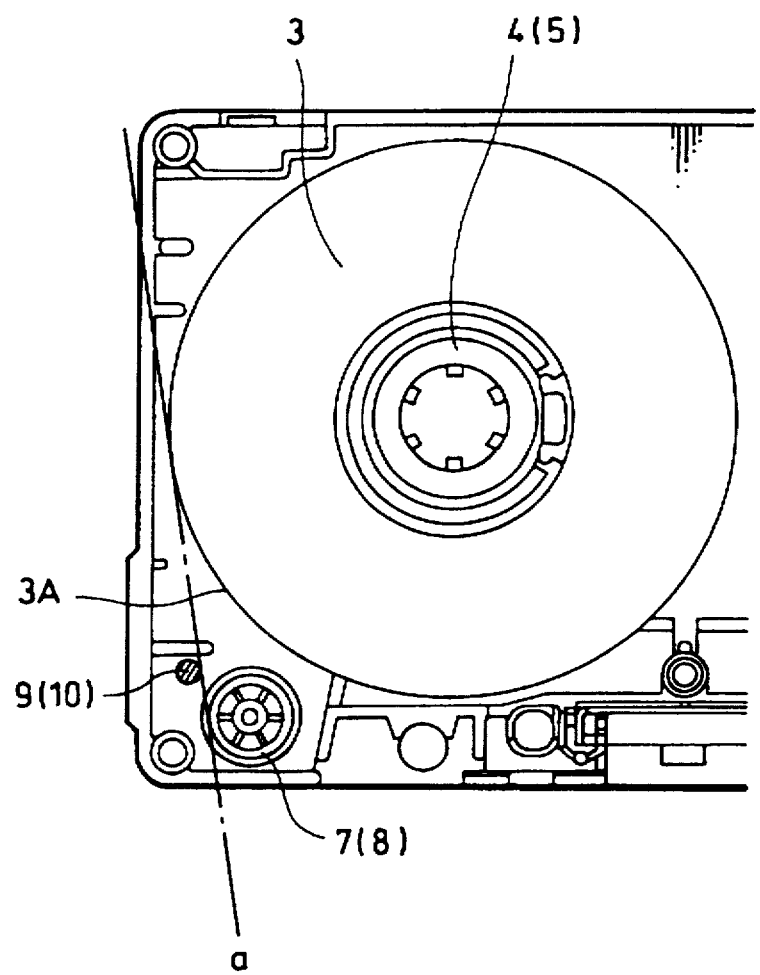
FIG. 2 is a fragmentary plan view used to explain the position of fixed guide pins in the conventional tape cassette.
Figure 3:
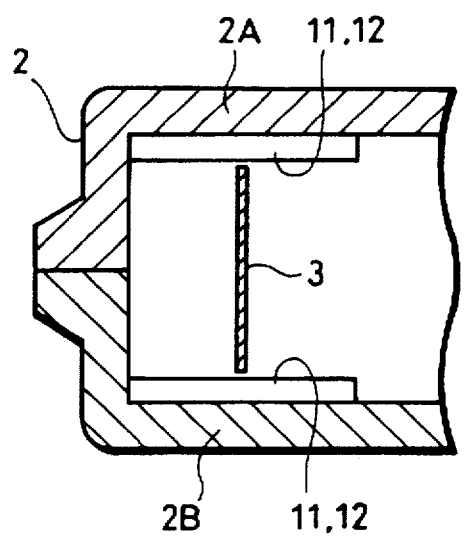
FIG. 3 is a fragmentary cross-sectional view used to explain guide ribs for restricting a width direction fluctuations of a magnetic tape.
Figure 4:
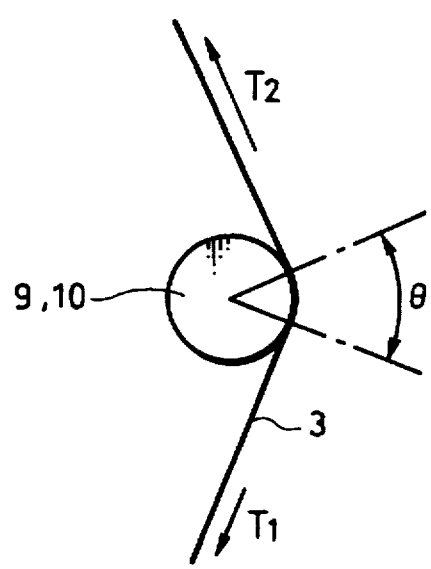
FIG. 4 is a schematic diagram showing a manner in which the magnetic tape is wound around the fixed guide pins.

As shown in FIG. 3, the guide ribs 11, 12 are formed at the symmetrical positions on the upper cassette shell 2A and the lower cassette shell 2B of the cassette housing 2. The amounts in which the guide rubs 11, 12 are protruded from the inner surfaces of the upper cassette shell 2A and the lower cassette shell 2B are the same. The guide ribs 11, 12 restrict upper and lower edge portions of the magnetic tape 3, whereby the magnetic tape 3 is suppressed from fluctuation in its width direction and can be transported in substantially the center of the space within the cassette housing 2. Therefore, the magnetic tape 3 can be uniformly wound around the reel hubs 4, 5.

As shown in FIG. 5, the opening portion 6 at its central portion in which the magnetic tape 3 is exposed is a head insertion portion into which a magnetic head (not shown) is inserted. To the inner part of the head insertion portion, there is assembled a leaf spring 15 comprising a metal shield plate 15 for magnetically shielding the magnetic tape 3 wound around the reel hubs 4, 5 and the magnetic head and a pressing pad 14 made of felt for urging the magnetic tape 3 against the magnetic head. The pressing pad 14 is attached to the central portion of the leaf spring 15.

In the front portion of the cassette housing 2, there are symmetrically defined cassette position positioning reference apertures 16, 17 and capstan insertion apertures 18, 19 at the same positions of the upper cassette shell 2A and the lower cassette shell 2B, respectively.

The most specific feature of the tape cassette according to the present invention lies in the positions of the fixed guide pins 9, 10. The positions of the fixed guide pins 9, 10 will be described below in detail.

In order to reduce a frictional force generated between the fixed guide pins 9, 10 and the magnetic tape 3 when the magnetic tape 3 is transported, it is effective to reduce the wrapping angle θ at which the magnetic tape 3 is wound around the fixed guide pins 9, 10. As is clear from the aforementioned equation (1), as the wrapping angle θ at which the magnetic tape 3 is wound around the fixed guide pins 9, 10 becomes small, a frictional force generated between the fixed guide pins 9, 10 and the magnetic tape 3 becomes small.

Therefore, to reduce the tape wrapping angle θ, in the tape cassette according to this invention, the fixed guide pins 9, 10 are disposed at positions different from that of the conventional tape cassette.

The positions of the fixed guide pins 9, 10 are determined as follows.

The thickness and length of the magnetic tape 3 wound around the fixed guide pins 9, 10 are variously changed in accordance with a reproducing (or recording) time. Although the maximum winding diameter is not standardized, a practical maximum value of a tape winding diameter obtained in consideration of standardized value of hub diameter (greater than 21 mm in diameter) based on the IEC standard, tape thickness and tape length standardized in the MIAJ standard and the space of the cassette housing is about 53 mm in diameter.

Figure 6:
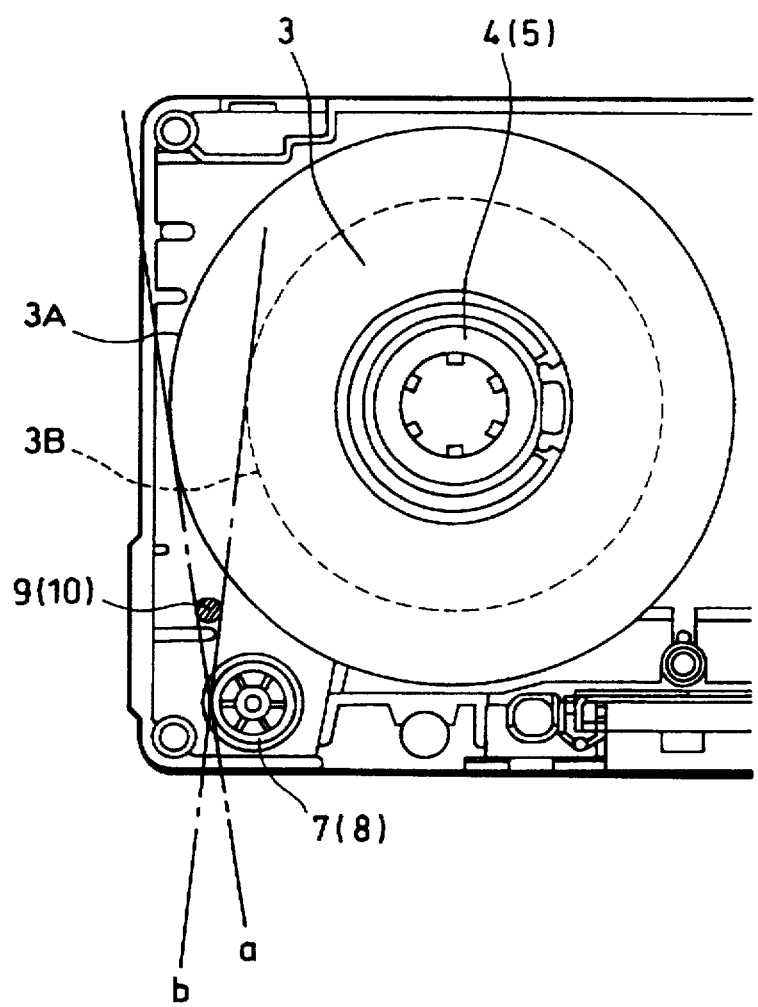
FIG. 6 is a fragmentary plan view used to explain the position of fixed guide pins in the tape cassette according to the present invention.

As shown in FIG. 6, based on a tape maximum winding diameter 3A of about 53 mm, there is assumed a common outer tangent a which contacts with the tape maximum winding diameter 3A and the circumferential surfaces (tape guide surfaces) of the rotating guide rollers 7, 8. Then, the fixed guide pins 9, 10 are disposed at positions not only inside the common outer tangent a but also in contact with the common outer tangent a.

Since the fixed guide pins 9, 10 are disposed at the above position, in the tape cassette according to the present invention, the wrapping angle θ at which the magnetic tape 3 is wound around the fixed guide pins 9, 10 when the magnetic tape 3 is transported can be made smaller than that of the conventional tape cassette.

Although the wrapping angle θ of the magnetic tape 3 is changed as the tape winding diameters of the reel hubs 4, 5 are changed during the magnetic tape 3 is transported, in the tape cassette according to this embodiment, the tape wrapping angle θ can be prevented from exceeding 40° at maximum. In this embodiment, a measured value is 39.6° at maximum.

Specifically, in the tape cassette according to the present invention, since the wrapping angle θ at which the magnetic tape 3 is wound around the fixed guide pins 9, 10 is constantly made less than 40°, a frictional force generated between the fixed guide pins 9, 10 when the magnetic tape 3 is transported can be suppressed compared with the conventional tape cassette. Accordingly, the frictional force is reduced compared with the conventional tape cassette and a load imposed upon a motor for transporting the magnetic tape 3 also is decreased so that a motor drive current can be reduced.

Having compared consumed currents of a small cassette player by use of the conventional tape cassette and the tape cassette according to the present invention, compared results were obtained. According to the compared results, the tape cassette according to the present invention could reduce the current value by about 5% compared with the conventional tape cassette.

If the fixed guide pins 9, 10 are disposed nearer the inside from the position contacting the common outer tangent a, then the wrapping angle θ at which the tape 3 is wound around the fixed guide pins 9, 10 can be reduced, thereby reducing a frictional force. In this case, when the wrapping angle θ at which the magnetic tape 3 is wound around the fixed guide pins 9, 10 is large, it is frequently observed that the magnetic tape 3 on the tape travel path is not in contact with the fixed guide pins 9, 10.

Since the fixed guide pins 9, 10 function to suppress the magnetic tape from being fluctuated in its width direction by a slide resistance against the magnetic tape 3 to thereby keep the tape winding shape uniform. Therefore, if the state that the magnetic tape 3 is not in contact with the fixed guide pins 9, 10 is continued for a long period of time, then the uniform tape winding shape is disturbed so that the magnetic tape 3 is urged against the guide ribs 11, 12 strongly, thereby causing the edge of the magnetic tape 3 to be damaged. If the fixed guide pins 9, 10 are disposed at the position in which the magnetic tape 3 is not in contact with the fixed guide pins 9, 10 for a long period of time, then a durability of the magnetic tape 3 is deteriorated. Therefore, the fixed guides pins 9, 10 should preferably be disposed at the proper position as described above.

Therefore, as shown in FIG. 6, the fixed guide pins 9, 10 should preferably be disposed outside of a common outer tangent b contacting with a winding diameter (winding diameter obtained when the amounts of the magnetic tape 3 wound around the reel hubs 4, 5 become equal to each other, and is about 40 mm in diameter) obtained when the magnetic tape 3 wound around the reel hubs 4, 5 at maximum is reduced to half and the circumferential surfaces (tape guide surfaces) of the rotating guide rollers 7, 8.

As described above, there is provided a tape cassette in which a pair of reel hubs around which a magnetic tape is wound is rotatably housed in a cassette housing and rotating guide rollers and fixed guide pins for guiding the magnetic tape are disposed on a tape travel path between a pair of reel hubs. The tape cassette according to the present invention is characterized in that the fixed guide pins are disposed at positions in which the wrapping angle of the magnetic tape wound around the fixed guide pins is not greater than 40°.

According to the present invention, since a frictional force generated between the fixed guide pins when the magnetic tape is transported is reduced as compared with the conventional tape cassette, a motor drive current of a motor for transporting the magnetic tape can be reduced. As the motor drive current is reduced, a life of a battery in a small cassette player is extended, and hence the tape cassette according to the present invention becomes useful. Since the life of the battery is extended, an amount of wasted batteries can be suppressed, which contributes to an environmental sanitation.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A tape cassette comprising:

a cassette housing;

a pair of reel hubs around which a magnetic tape is would, said pair of reel hubs being rotatably housed in said cassette housing;

rotating guide rollers and fixed guide pins for guiding said magnetic tape and being disposed in a tape travel path between said pair of reel hubs, wherein said fixed guide pins are disposed at selected positions in said housing in which a wrapping angle at which said magnetic tape is wound around each of said fixed guide pins does not exceed 40°.

2. A tape cassette as claimed in claim 1, further comprising a plurality of guide ribs formed in said housing for restricting a width direction movement of said magnetic tape and disposed near one of said fixed guide pins and said rotating guide rollers.

3. A tape cassette as claimed in claim 2, wherein said guide ribs are disposed in said housing between said fixed guide pins and said rotating guide rollers.

4. A tape cassette as claimed in claim 2, wherein said cassette housing comprises an upper cassette shell and a lower cassette shell and said plurality of guide ribs includes first guide ribs disposed on said upper cassette shell and second guide ribs disposed on said lower cassette shell.

5. A tape cassette as claimed in claim 4, wherein said first guide ribs disposed on said upper cassette shall and said second guide ribs disposed on said lower cassette shell protrude from inner surfaces of said upper cassette shell and said lower cassette shell to a substantially equal extent.

* * * * *